(12) United States Patent
Zhan et al.

(10) Patent No.: US 8,344,657 B2
(45) Date of Patent: Jan. 1, 2013

(54) LED DRIVER WITH OPEN LOOP DIMMING CONTROL

(75) Inventors: Xiaodong Zhan, Plano, TX (US); Fred Greenfeld, Nederland, CO (US); Xiangxu Yu, Shenzhen (CN)

(73) Assignee: Intersil Americas Inc., Milpitas, CA (US)

( * ) Notice: Subject to any disclaimer, the term of this patent is extended or adjusted under 35 U.S.C. 154(b) by 432 days.

(21) Appl. No.: 12/770,993

(22) Filed: Apr. 30, 2010

(65) Prior Publication Data
US 2011/0101877 A1   May 5, 2011

Related U.S. Application Data

(60) Provisional application No. 61/257,803, filed on Nov. 3, 2009.

(51) Int. Cl.
*H05B 41/36* (2006.01)
(52) U.S. Cl. ........ 315/302; 315/291; 315/299; 315/307; 315/312
(58) Field of Classification Search .................. 315/177, 315/200 R, 291, 246, 250, 254, 272, 274, 315/276, 279, 287, 294, 299, 300, 302, 307, 315/312, 313, 361, 362
See application file for complete search history.

(56) References Cited

U.S. PATENT DOCUMENTS

| | | | |
|---|---|---|---|
| 6,373,200 B1 * | 4/2002 | Nerone et al. | 315/291 |
| 2006/0186831 A1 * | 8/2006 | Newman et al. | 315/291 |
| 2007/0182338 A1 * | 8/2007 | Shteynberg et al. | 315/200 R |
| 2010/0109548 A1 * | 5/2010 | Matsuda | 315/279 |

* cited by examiner

*Primary Examiner* — Douglas W. Owens
*Assistant Examiner* — Jianzi Chen
(74) *Attorney, Agent, or Firm* — Gary Stanford (57) ABSTRACT

An LED driver with open loop dimming including a full wave rectifier circuit, a DC/DC converter, and an oscillator circuit. The rectifier is configured to receive an input voltage in the form of an AC conductive angle modulated voltage and to provide a rectified voltage. The DC/DC converter converts the rectified voltage to an output voltage and an output current, where the output current has a magnitude which varies proportionately with a square of a quadratic mean of the input voltage. The oscillator circuit controls switching of the DC/DC converter with constant frequency and constant duty cycle. The DC/DC converter may be a flyback converter and may include a transformer operated in DCM. The driver may include output voltage and/or output current limit. The output current may be limited when the input voltage is within normal operating range of an AC line voltage from which the input voltage is derived.

20 Claims, 5 Drawing Sheets

LED DRIVER WITH OPEN LOOP DIMMING CONTROL

CROSS-REFERENCE TO RELATED APPLICATIONS

This application claims the benefit of U.S. Provisional Application Ser. No. 61/257,803, filed on Nov. 3, 2009, which is hereby incorporated by reference in its entirety for all intents and purposes.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
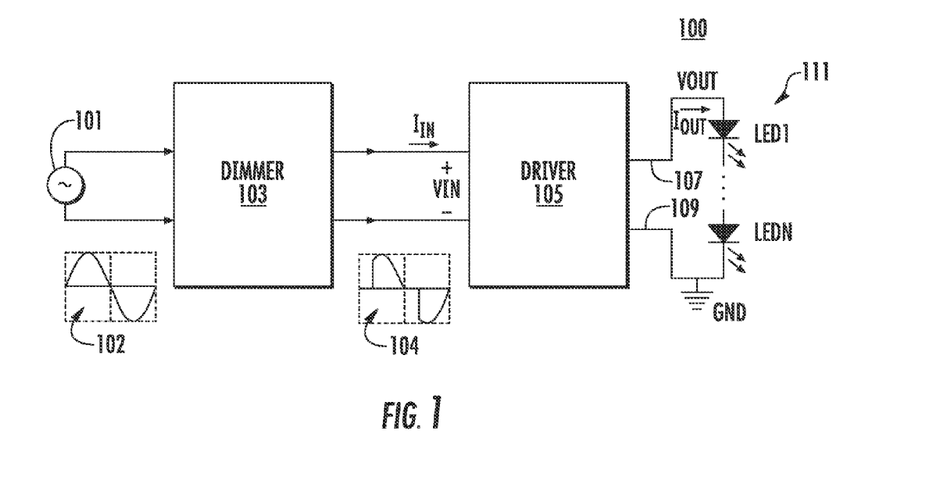
FIG. 1 is a simplified block diagram of a light emitting diode (LED) control circuit including an LED driver circuit implemented according to one embodiment.

FIG. 1 is a simplified block diagram of a light emitting diode (LED) control circuit 100 including an LED driver circuit 105 implemented according to one embodiment. The LED control circuit 100 includes a dimmer circuit 103 and the LED driver circuit 105, in which the input of the dimmer circuit 103 is coupled to an alternating current (AC) source 101 and the output of the LED driver circuit is coupled to an LED circuit 111 including N individual LEDs, in which "N" is a positive integer greater than zero (N is one or more). The LED circuit 111 is shown with LEDs coupled in series between an output voltage VOUT of the LED driver circuit 105 and a reference voltage node, such as ground (GND). It is noted that the LED circuit 111 may include a single LED, or may include multiple LEDs coupled in any one of many different configurations, such as any combination of series and/or parallel couplings as understood by those skilled in the art. The AC source 101 generally provides a sinusoidal AC line voltage, such as depicted at 102, to the input of the dimmer circuit 103. The AC line voltage has a normal operating range between a minimum root-mean square (RMS) voltage (a.k.a., quadratic mean voltage), and a maximum RMS voltage and has a nominal operating voltage level between the minimum and the maximum RMS voltages. In the United States (US), for example, an AC line voltage provided by a standard outlet may have a nominal RMS voltage of about 120V, a minimum RMS voltage of about 104V, and a maximum RMS voltage of about 140V. Such voltages and ranges are exemplary only in which they may vary by location or jurisdiction. The voltages in Europe, for example, are generally about twice that of the US. The dimmer circuit 103 is generally an AC conductive angle modulated dimmer which converts an AC line voltage to an AC conductive angle modulated voltage. In one embodiment, for example, the dimmer circuit 103 is implemented as a triac dimmer or the like. The dimmer circuit 103 operates to selectively chop one or both of the leading edge and the trailing edge of the AC line voltage at any angle between 0 and 180 degrees for every half cycle (i.e., 180 degrees), to provide an AC conductive angle modulated voltage or "chopped" voltage VIN, such as depicted at 104, having a positive polarity (+) and a negative polarity (−).

In conventional configurations, the AC conductive angle modulated voltage at the output of the dimmer circuit 103 was applied directly to at least one incandescent light bulb (not shown). The incandescent light bulb is replaced by the LED circuit 111 and the driver circuit 105 is interposed between the dimmer circuit 103 and the LED circuit 111. The driver circuit 105 performs several functions to convert the output of the dimmer circuit 103 to the desired output for driving the LED circuit 111. The driver circuit 105 may perform a voltage stepdown depending upon the number and configuration of the LED circuit 111. The output current of the driver circuit 105, shown as $I_{OUT}$, is adjusted by the driver circuit 105 in response to changes of VIN provided at the output of the dimmer circuit 103. As noted above, the dimmer circuit 103 selectively chops leading and/or trailing edges of the AC line voltage with application of the dimming function to generate VIN. Thus, as the dimming or chopping function is increased, the RMS voltage of VIN voltage decreases from an upper RMS voltage with little or no chopping to reduced RMS voltages with increased chopping. The driver circuit 105 reduces $I_{OUT}$ as the RMS voltage of VIN decreases.

Closed-loop LED drivers (not shown) are known. The AC line voltage (e.g., 102) is distorted to provide the AC conductive angle modulated voltage (e.g., 104), resulting in a high voltage change (dV/dt) at least once during each cycle. The input current to the driver 105, shown as $I_{IN}$, has a similar modulated form resulting in high charge current. For closed-loop LED drivers, the corresponding high charge current can cause an undesirable interaction between the dimmer circuit 103 and a closed-loop LED driver, such as malfunction of the dimmer circuit 103, undesirable audible noise, as well as undesirable flicker of the LED circuit 111. A problem with closed-loop LED drivers is that they are difficult to stabilize, have a limited duty cycle, and generally exhibit power loss with reduced efficiency. The driver circuit 105, however, is configured as an open loop driver circuit and overcomes the deficiencies of closed-loop LED drivers.

Figure 2:
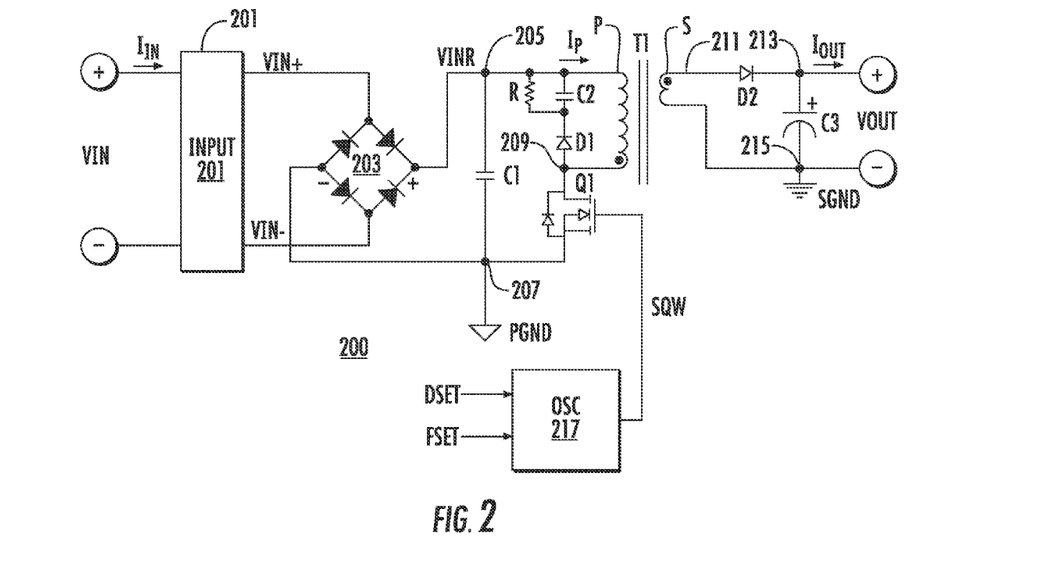
FIG. 2 is a simplified schematic and block diagram of an open loop driver circuit according to one embodiment which may be used as the driver circuit of FIG. 1 receiving VIN and providing VOUT, and further for controlling output current $I_{OUT}$ based on the voltage level of VIN.

FIG. 2 is a simplified schematic and block diagram of an open loop driver circuit 200 according to one embodiment which may be used as the driver circuit 105 receiving VIN and providing VOUT, and further for controlling output current $I_{OUT}$ based on the voltage level of VIN. The positive and negative polarities of VIN are provided to respective inputs of an input circuit 201, having output terminals providing corresponding voltages VIN+ and VIN−. VIN+ and VIN− are provided to respective input terminals of an H-bridge full-wave rectifier 203, having a positive output terminal coupled to a node 205 and a negative output terminal coupled to a node 207. Node 205, which develops a "rectified" input voltage VINR, is further coupled to one end of a filter capacitor C1, to one end of a resistor R, to one end of another capacitor C2, and to one terminal of a primary winding P of a transformer T1. The other terminal of the primary winding P is coupled to the anode of a diode D1 and to the drain of an electronic switch Q1. The cathode of D1 is coupled to the other end of the resistor R and to the other end of the capacitor C2. The source of the switch Q1 is coupled to node 207, which is further coupled to a primary ground (PGND). The other end of the filter capacitor C1 is coupled to PGND. The transformer T1 has a secondary winding S having a first terminal coupled to a node 211 and a second terminal coupled to another node 215. Node 211 is coupled to the anode of a diode D2, having its cathode coupled to an output node 213 developing a positive polarity of the output voltage VOUT. Node 213 is coupled to one end of an output filter capacitor C3, having its other end coupled to node 215 which is further coupled to a secondary ground (SGND). SGND forms the negative polarity of VOUT. Although not shown in FIG. 2, when the driver circuit 200 is used as the driver circuit 105, the LED circuit 111 is coupled between VOUT and SGND. An oscillator 217 has inputs receiving values DSET and FSET and has an output providing a square-wave signal SQW provided to the gate of the switch Q1.

The AC voltage across VIN+ and VIN− (or VIN+/−) is a filtered version of the AC conductive angle modulated input voltage VIN, in which each has approximately the same RMS or quadratic mean voltage level. VINR is a rectified version of VIN+/−. In one embodiment, the capacitance of C1 is relatively low for higher frequency electromagnetic interference (EMI) filtering and/or switching frequency filtering, so that the RMS voltage of VIN is substantially equal to the RMS voltage of VIN+/−. Thus, the RMS voltage of VINR is substantially the same as the RMS value of VIN. In this manner, the driver circuit 200 achieves a high power factor (PF), or PF≈1.

The schematic and block diagram of the driver circuit 200 is simplified and many variations are possible. The input circuit 201 may incorporate various functions as known to those skilled in the art, such as inrush current limit and EMI protection, among other possible functions. The diode D1, the resistor R and the capacitor C1 form a snubber circuit which filters out voltage spikes that may affect operation of the switch Q1. Various different types of snubber circuits are known and contemplated. The switch Q1 is shown as an N-type metal-oxide semiconductor, field-effect transistor (MOSFET), although other types of electronic switches are contemplated such as P-type devices or other types of FETs and the like. In general, the switch Q1 has a current path (e.g., drain-source or source-drain) coupled in series with a primary winding P of the transformer T1 and has a control input (e.g., gate). The secondary or output portion of the transformer T1 is simplified and may include various other types of circuits, such as additional filter capacitors, snubber circuits, current sensors, etc. The output capacitor C3 reduces or otherwise removes output voltage ripple, and may be implemented by multiple capacitors of various types and having various capacitances as known by those skilled in the art. The transformer T1 provides isolation between the input and output. Non-isolation embodiments are contemplated, such as a single-ended primary inductor converter (SEPIC), in which a non-isolating inductor (not shown) replaces the transformer T1. The oscillator 217 is shown in simplified form. In one embodiment, the oscillator 217 outputs the SQW signal with a fixed frequency (F) and a fixed duty cycle (D). In another embodiment, the frequency F and duty cycle D are adjusted per values FSET and DSET, respectively, and determined apriori based on circuit implementation and parameters to operate as described herein, and then remain fixed during normal operation. Although not shown, various protection circuits may be added, such as over-current protection and/or over-voltage protection circuits which may modify the frequency and/or duty cycle during abnormal conditions (e.g., over-current, over-voltage, etc.). As further described below, an output current control circuit may be added which adjusts the duty cycle and/or frequency of SQW to limit the output current to a maximum level.

The switch Q1, the transformer T1 and other circuitry of the driver circuit 200 are configured to operate as a flyback converter. In accordance with one embodiment, the transformer T1 is operated in a discontinuous current mode (DCM), which means that fluctuating current through the transformer T1 goes down to zero before or just at the end of each switching cycle of the switch Q1. More specifically, the current through the primary winding P of the transformer T1, shown as $I_P$, increases while the switch Q1 is turned on by SQW, which causes the current and thus the energy stored in the primary winding P of the transformer T1 to increase. While the switch Q1 is on, the output rectifier diode D2 is off, and there is little or no current and thus little or no energy stored in the secondary winding S of the transformer T1. When the switch Q1 is turned off by SQW, the diode D2 is turned on, and the current and thus the energy in the primary winding P of the transformer T1 is transferred to the secondary winding S of transformer T1, and thus provided into the capacitor C3 and as output current $I_{OUT}$ provided to the load (e.g., the LED circuit 111). Also, while the switch Q1 is turned off, the primary current $I_P$ through the primary winding P goes down to zero according to the DCM described above.

Figure 3:
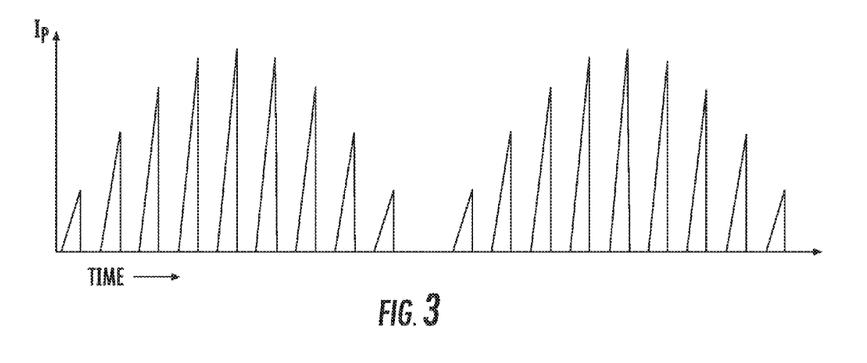
FIG. 3 is a timing diagram plotting the primary current of the transformer of FIG. 2 versus time according to DCM mode of operation.

FIG. 3 is a timing diagram plotting the primary current $I_P$ versus time according to DCM mode of operation, illustrating only one example of the primary current $I_P$ through the transformer T1. When the switch Q1 is turned on, the primary current $I_P$ rises at a relatively linear rate based on the voltage of VIN on node 205. The switch Q1 is turned off each cycle, causing primary current $I_P$ to completely return to zero before the switch Q1 is turned back on again. In DCM mode as shown, there is a delay between when primary current $I_P$ goes to zero to when the switch Q1 is turned back on. Thus, the primary current $I_P$ goes to zero before the switch Q1 is turned back on. Although not shown, the secondary current through the secondary winding S returns to zero to keep the converter running in DCM and stays at zero while the switch Q1 is turned on. During this time, the voltage in the capacitor C3 drives the output current $I_{OUT}$ into the load. This is repeated every switching cycle of SQW. An exemplary and non-limiting switching frequency of SQW is about 50 kilo-Hertz (kHz), although other switching frequencies are contemplated as further described herein.

The constant duty cycle and constant frequency of switching of the flyback converter provide for flicker free dimming. When using DCM control, a high power factor (PF) can be achieved, as will now be explained. For the driver circuit 200, the on time (Ton) of the switch Q1 is normally constant for each line cycle, in which line cycle is a cycle of the AC line voltage. This is because the frequency (F) and the duty cycle (D) of SQW is constant. For each switching cycle, the average current (Iavg) in the primary winding P of the transformer T1 is determined using the equation Iavg=0.5·Ipeak·D=0.5·VIN·D²/F/Lp=VIN/$R_E$, where Ipeak is the peak value of $I_P$, where Lp is the inductance of the primary winding P of the transformer T1, where $R_E$ is the equivalent resistance of the driver circuit 200, where a dot symbol "·" denotes multiplication and where a forward slash "/" denotes division. Because D, F and Lp are constants, this equation can be rewritten as Iavg=K·VIN in which "K" is a constant. This relationship leads to $R_E$=2·Lp·F/D². During each line cycle, $R_E$ is constant, and the input current $I_{IN}$=VIN/$R_E$. Thus, the power factor PF≈1 as the effective input impedance of the driver circuit 200 is purely resistive. Further, because the equivalent LED input impedance $R_E$ is constant, not only for one line cycle but also for different input voltages, the LED circuit 111 may be dimmed in a manner similar to a true incandescent light bulb (which also acts as a resistor).

Figure 4:
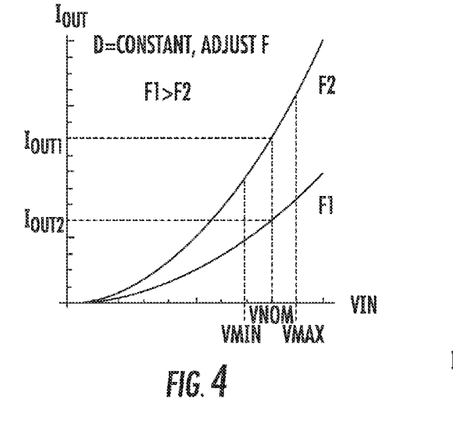
FIG. 4 is a graphic diagram plotting $I_{OUT}$ versus VIN for a constant duty cycle D with adjustment of frequency F for the driver circuits of FIG. 2 or 6.

For the driver circuit 200, the input power $(P_{IN})$=VIN²/$R_E$=$P_{out}$/EFF=$I_{OUT}$*VOUT/EFF, where "EFF" is the efficiency of the driver circuit 200. Thus, the output current $I_{OUT}$=(VIN²*Eff/$R_E$)/VOUT. Since the efficiency, equivalent resistance, and output voltage are close to constant, then $I_{OUT}$=K*VIN². FIG. 4 is a graphic diagram plotting $I_{OUT}$ versus VIN for a constant duty cycle D with adjustment of frequency F. D can be set to a predetermined maximum value DMAX to achieve a high efficiency. In one embodiment, DMAX is 50%. Further, in accordance with an embodiment, the frequency F is set for a desired output current $I_{OUT}$ at a nominal input voltage (VNOM), which is between a "minimum" input voltage VMIN and a "maximum" input voltage VMAX. It is noted that VMIN, VNOM and VMAX are voltage values associated with the AC line voltage provided by the AC source 101 to the input of the dimmer 103. The AC line voltage has a normal operating range between VMIN and VMAX having a nominal voltage level of VNOM. As previously described in one embodiment, for example, the nominal input voltage of the AC line voltage is 120V. If the dimmer 103 is set full on (no dimming function) then VIN is substantially the same as the AC line voltage. As the dimming function of the dimmer 103 is increased (e.g., increased modulation of the AC line voltage), then the RMS voltage level of VIN decreases relative to the RMS voltage level of the AC line voltage. In this manner, the minimum level of VIN is below VMIN of the AC line voltage. VIN, for example, may range from 0V or near 0V up to VMAX.

As shown in FIG. 4, for a higher output current, shown as $I_{OUT1}$, F is set at a lower frequency level F2, and for a lower output current, shown as $I_{OUT2}$, F is set at a higher frequency level F1. The desired level of $I_{OUT}$ is selected based on the type, number and coupling configuration of the LED circuit 111 being driven at the output. For a simple non-limiting example, if the load includes 6 LEDs connected in series, and the desire is to provide light equivalent to that provided by an 100 Watt (W) incandescent light bulb, then $I_{OUT}$ is selected to be about 700 milli-amperes (mA). Assuming constant D for this example, F is adjusted so that $I_{OUT}$ is about 700 mA at the nominal voltage level of the AC line voltage.

Figure 5:
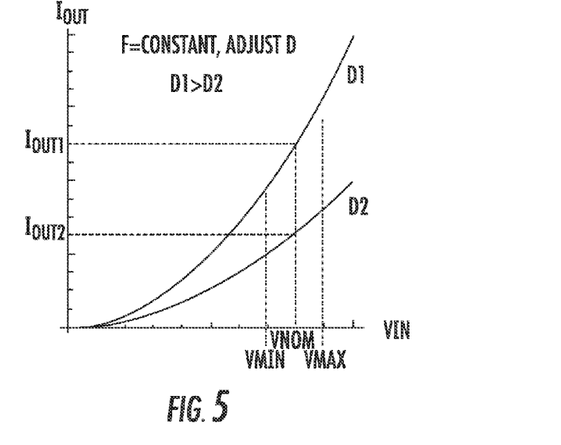
FIG. 5 is a graphic diagram plotting $I_{OUT}$ versus VIN for a constant frequency F with adjustment of duty cycle D for the driver circuits of FIG. 2 or 6.

Since $R_E$=2·Lp·F/D², the desired $I_{OUT}$ can also be achieved by setting the duty cycle (D) for a constant frequency F. FIG. 5 is a graphic diagram plotting $I_{OUT}$ versus VIN for a constant frequency F with adjustment of duty cycle D. Again, VMIN, VNOM and VMAX are associated with the AC line voltage. In this case, the duty cycle D is set for a desired output current $I_{OUT}$ at the nominal voltage level VNOM. As shown in FIG. 5, for a higher output current, shown as $I_{OUT1}$, D is set at a higher level D1, and for a lower output current, shown as $I_{OUT2}$, D is set at a lower level D2. Again, the desired level of $I_{OUT}$ is selected based on the type, number and coupling configuration of the LED circuit 111 being driven at the output.

In accordance with an embodiment, to ensure DCM operation during normal operating conditions, the transformer T1 is fully reset during the off time of the switch Q1. To ensure this, VOUT>$VIN_{PEAK}$*$N_{SEC}$*D/$N_{PRI}$/(1–D), where $VIN_{PEAK}$ is the peak level of the input voltage VIN, $N_{SEC}$ is the number of winding turns in the secondary winding S of the transformer T1, and $N_{PRI}$ is the number of winding turns in the primary winding P of the transformer T1. In this case, VOUT is determined for the minimum number of LEDs of the LED circuit 111 connected as the load. Additionally, to ensure DCM operation during normal operating conditions, the transformer T1 should not be saturated at a minimum switching frequency. With this in mind, the number of windings (i.e., $N_{PRI}$) and the inductance Lp of the primary winding P are determined.

Figure 6:
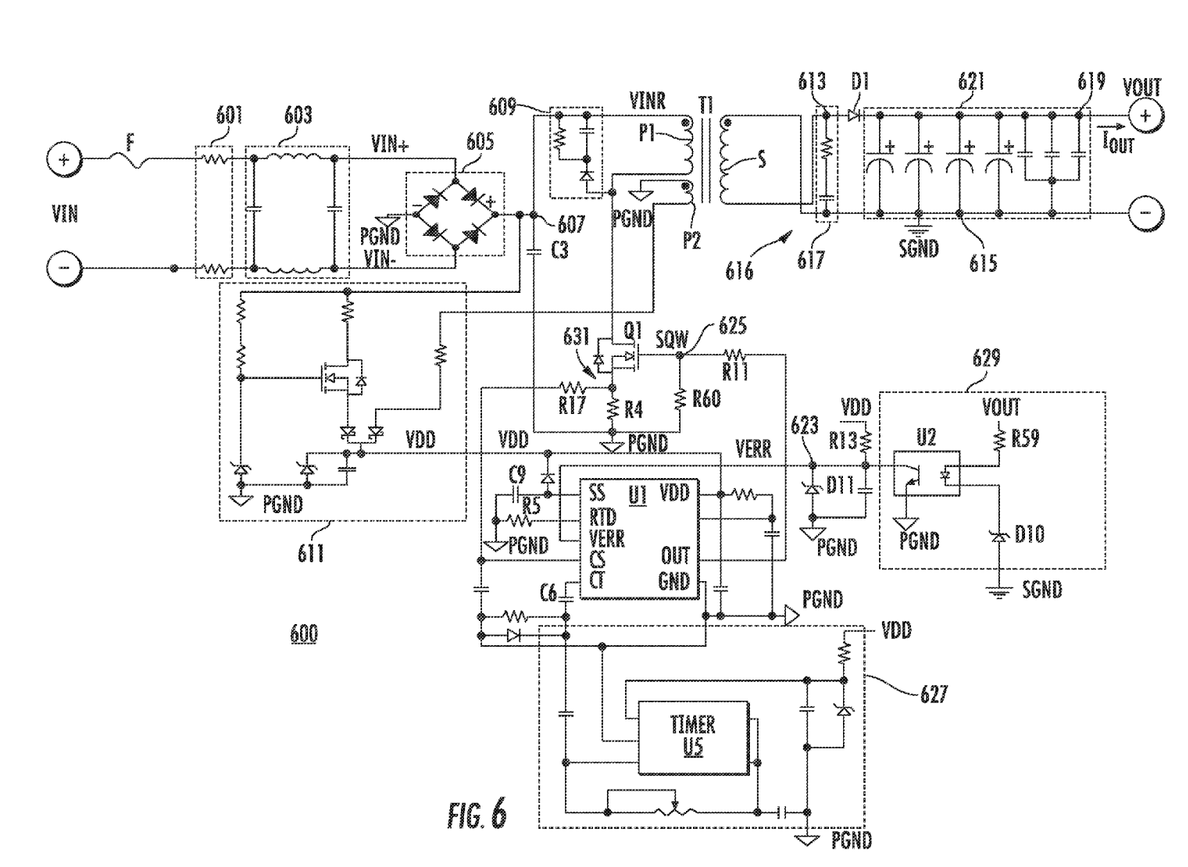
FIG. 6 is a more detailed schematic diagram of an open loop driver circuit according to one embodiment which may be used as the driver circuit of FIG. 1 receiving VIN and providing VOUT, and further for controlling output current $I_{OUT}$ based on the voltage level of VIN.

FIG. 6 is a more detailed schematic diagram of an open loop driver circuit 600 according to one embodiment which may be used as the driver circuit 105 receiving VIN and providing VOUT, and further for controlling output current $I_{OUT}$ based on the voltage level of VIN. The positive and negative polarities of VIN are provided through a fuse F, an inrush current limiting circuit 601 and an EMI filter 603 and provided as VIN+/– to the input terminals of an H-bridge full-wave rectifier 605. The negative terminal of the full-wave rectifier 605 is coupled to a primary ground (PGND), and the positive terminal of the full-wave rectifier 605 is coupled to a node 607 developing the rectified input voltage VINR. Node 607 is coupled to one end of a filter capacitor C3, to one end of a snubber circuit 609, to one terminal of a first primary winding P1 of a transformer T1, and to one input of a bias circuit 611. The other end of the capacitor C3 is coupled to PGND. The other end of the first primary winding P1 is coupled to the other end of the snubber circuit 609 and to the drain of an electronic switch Q1. The transformer T1 includes a second primary winding P2 coupled between PGND and another input of the bias circuit 611. The transformer T1 includes a secondary winding S coupled between nodes 613 and 615 further coupled to an output circuit 616. Node 615 is coupled to a secondary ground (SGND). The output circuit 616 in this case includes an output snubber circuit 617, a rectifier diode D1, and an output filter 621. The output snubber circuit 617 is coupled between nodes 613 and 615 and node 613 is coupled to the anode of the rectifier diode D1. The cathode of diode D1 is coupled to an output node 619 developing the output voltage VOUT. The output filter 621 is coupled between VOUT and SGND.

The source of switch Q1 is coupled to one end of a sense resistor R4 and to one end of another resistor R17, in which the other end of the sense resistor R4 is coupled to PGND. The other end of the resistor R17 is coupled to a current sense (CS) input of a controller U1. The bias circuit develops a source voltage VDD, which is provided to the VDD input of the controller U1, having a GND input coupled to PGND. A resistor R13 is coupled between VDD and node 623 which develops an error voltage VERR. A Zener diode D11 has its anode coupled to PGND and its cathode coupled to node 623. Node 623 is coupled to a VERR error input of the controller U1 so that U1 senses the VERR voltage. The controller U1 has an output coupled to one end of a resistor R11, having its other end coupled to a node 625 developing a control signal SQW. Node 625 is coupled to the gate of the switch Q1 and to one end of another resistor R60, having its other end coupled to PGND.

In a similar manner as previously described, VIN is an AC conductive angle modulated or chopped AC line voltage, and a load, such as the LED circuit 111, is provided between VOUT and SGND. VOUT provides voltage to the load and the driver circuit 600 develops the output current $I_{OUT}$ based on the RMS value of VIN to operate the LED circuit 111 as previously described for the driver circuit 200. The inrush current limiting circuit 601 includes series resistors, which decouple the dimmer circuit 103 from the EMI filter 603, dampen oscillations caused by the dimmer circuit 103, and generally limit input current as understood by those skilled in the art. The EMI filter 603 includes various filter components, such as inductors and capacitors and the like as understood by those skilled in the art. Further details of the circuits 601 and 603 are not described. The H-bridge full-wave rectifier 605 fully rectifies VIN+/− from the output of EMI filter 603 to provide the rectified input voltage VINR on node 607. In one embodiment, the capacitance of C3 is relatively low for higher frequency EMI filtering and/or switching frequency filtering, so that the RMS voltage of VINR is substantially equal to the RMS voltage of VIN+/−, which is a filtered version of VIN. Thus, the RMS voltage of VINR is substantially the same as the RMS value of VIN. In this manner, the driver circuit 600 also achieves a high power factor (PF≈1).

VINR is provided to the bias circuit 611 which develops the supply voltage VDD at startup to the controller U1. As the controller U1 begins developing SQW to control the switch Q1, the second primary winding P2 of the transformer T1 provides additional source voltage to the bias circuit 611 to maintain VDD as understood by those skilled in the art. Additional details of the bias circuit 611 are not further described. The snubber circuit 609 filters out voltage spikes that may affect operation of the switch Q1 as understood by those skilled in the art. Additional details of the snubber circuit 609 are not further described. The snubber circuit 617 filters out voltage spikes at the secondary winding S of the transformer T1 as understood by those skilled in the art. Additional details of the snubber circuit 617 are not further described.

The output filter 621 is used to reduce or otherwise substantially remove voltage ripple of VOUT. The output filter 621 generally includes one or more capacitors of different types and sizes for performing the filtering function as understood by those skilled in the art, although other configurations may be used. The capacitors of the output filter 621 also provide a current to the load (e.g., the LED circuit 111) when there is no current in the secondary winding S of the transformer T1 during discontinuous current mode (DCM) operation of the transformer T1. The capacitance of the output filter 621 is selected based on the characteristics, quantity and configuration of the load, such as the LED circuit 111. In one embodiment, the capacitance of the output filter 621 is sufficiently high enough to reduce the double line frequency voltage ripple and thus the current ripple in the LED circuit 111 to an acceptable level.

During normal operation, the controller U1 controls SQW at its output OUT to have a constant frequency and a constant duty cycle. Thus the SQW signal at the gate of Q1 is a square-wave signal which has constant frequency and constant duty cycle in a similar manner as described above for the oscillator 217. The constant duty cycle and frequency provide for flicker free dimming of the LED circuit 111. The controller U1 can be implemented, for example, using an ISL6745 bridge controller with precision dead time control, available from Intersil of Milpitas, Calif., but is not limited thereto. The duty cycle of SQW is adjusted based on the voltage level of VERR, which in turn controls the on time of the switch Q1. During normal operation, the Zener diode D11 sets the voltage level of VERR at a relatively constant level, so that the duty cycle of SQW is also relatively constant during normal operation. A timing resistor R5 is coupled between an RTD input of the controller U1 and PGND. A timer circuit 627 has a control terminal coupled through a capacitor C6 to a CT input of the controller U1. The timer circuit 627 is shown including a timer module U5, such as a 555-type timer device as known to those skilled in the art. In one embodiment, the timer module is an MIC1555 timer available from Micrel, Inc. of San Jose, Calif., although other types of timing devices may be used. The timer circuit 627 includes several other devices and components as shown which are not further described as not necessary for a full and complete understanding of the present invention. In general, the timer circuit 627 is adjusted to control the oscillator timing capacitance coupled to the CT input of the controller U5. The timing resistor R5 coupled to the RTD input and the oscillator timing capacitance (adjusted via the timer circuit 627) collectively determine the frequency of the SQW signal during normal operation.

Configuration and normal operation of the driver circuit 600 is substantially similar to that described above for the driver circuit 200. The controller U1, the timer circuit 627 and the supporting circuitry are configured or otherwise adjusted so that SQW has a fixed duty cycle and a fixed frequency. Given this relationship, the output current $I_{OUT}$ varies as a function of the square of the input voltage VIN, or $I_{OUT}=K*VIN^2$ in a similar manner previously described for the driver circuit 200. Given a known nominal level of VIN and corresponding voltage range and a determination of nominal output current $I_{OUT}$ based on the desired load (e.g., LED circuit 111), the frequency F and/or duty cycle D are determined or otherwise adjusted based on the relationships shown in the graphs of FIG. 4 or FIG. 5. Although the normal operating frequency may be set constant and the duty cycle adjusted as shown in FIG. 5, the frequency of the driver circuit 600 is more easily programmed. As shown, the threshold voltage of the Zener diode D11 sets the voltage level of VERR during normal operation which sets the duty cycle to a fixed value as previously described. Based on the fixed value of the duty cycle, the relationship between $I_{OUT}$ and VIN according to that shown by the graph of FIG. 4 is consulted to determine the desired operating frequency. And then the timing circuit 627 is adjusted or otherwise programmed to achieve the desired operating frequency.

The driver circuit 600 further includes an over-voltage protection (OVP) circuit 629 which adjusts the voltage level of VERR when an over-voltage condition is detected. VOUT is coupled to one end of a resistor R59, having its other end coupled to a first input terminal of an optical coupler U2. A Zener diode D10 has an anode coupled to SGND and a cathode coupled to the second input terminal of the optical coupler U2. The optical coupler has a first output terminal coupled to node 623 and a second output terminal coupled to PGND. The optical coupler U2 provides isolation between the input and the output of the driver circuit 600 as understood by those skilled in the art (in which the output or secondary ground SGND is separate from the input or primary ground PGND). The voltage threshold of the Zener diode D10 is selected to detect a maximum voltage level of VOUT, such as VOUTMAX. During normal operation, VOUT is below VOUTMAX, D10 does not conduct, the optical coupler U2 is off and the voltage of VERR is determined by D11. When the voltage of VOUT reaches or otherwise begins to exceed VOUTMAX, D10 starts conducting turning on the optical coupler U2, which reduces the voltage of VERR. When the optical coupler U2 is turned on, it tends to reduce the voltage level of VERR which in turn reduces the duty cycle of SQW. This has the effect of clamping VOUT to a voltage level at or near VOUTMAX. As a non-limiting example, a threshold voltage for D10 of 21V plus a photo diode voltage drop of 2V at the input of the optical coupler U2 sets VOUTMAX at approximately 23V.

The driver circuit 600 includes an over-current protection (OCP) circuit 631 including the current sense resistor R4 and the resistor R17 coupled to the current sense (CS) input of the controller U1. In one embodiment, when the voltage at CS exceeds a predetermined voltage level, the controller U1 reduces the duty cycle of SQW to implement pulse-by-pulse current limiting. If the over-current threshold is exceeded during operation, the controller U1 initiates a delayed shutdown sequence. Once an over-current condition is detected, a soft-start (SS) charge current source is disabled. Additionally, a soft-start capacitor C9 coupled between an SS input of the controller U1 and PGND begins discharging, and if it discharges to less than a predetermined sustained over-current threshold, a shutdown condition occurs and the output OUT of the controller U1 is forced low. When the soft-start voltage reaches a predetermined reset threshold, a soft-start cycle begins. If the over-current condition ceases, and then an additional predetermined period elapses before the shutdown threshold is reached, no shutdown occurs. This results in the soft-start charging current being re-enabled so that the soft-start voltage is allowed to recover.

The operation of the driver circuits 200 and 600 are similar in that the output current $I_{OUT}$ varies with the square of the input voltage VIN as shown in FIGS. 4 and 5 when used as the driver circuit 105 of the LED control circuit 100. While the dimming function of the dimmer circuit 103 is set at a particular level, the RMS voltage of the input voltage VIN generally follows the RMS voltage of the AC line voltage. As indicated by FIGS. 4 and 5, however, as the AC line voltage varies within VMIN and VMAX, the output current $I_{OUT}$ also varies so that the relative brightness of the LED circuit 111 also varies. It is desired that the LED circuit 111 maintain the same level of full brightness when the AC line voltage is at any value between VMIN and VMAX while the dimmer circuit 103 is set to full on with minimal or no dimming.

Figure 7:
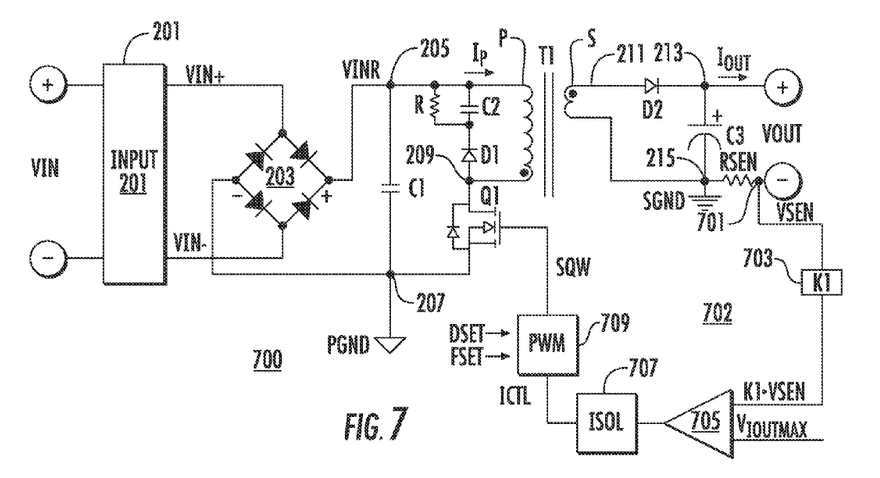
FIG. 7 is a simplified schematic and block diagram of an open loop driver circuit according to another embodiment which may be used as the driver circuit of FIG. 1, which further includes an output current control loop to limit current to a predetermined maximum current level.

FIG. 7 is a simplified schematic and block diagram of an open loop driver circuit 700 according to another embodiment which may be used as the driver circuit 105. The driver circuit 700 is similar to the open loop driver circuit 200, but further includes an output current control loop 702 for limiting the output current $I_{OUT}$ to a predetermined maximum current level. The open loop driver circuit 700 is similar to the open loop driver circuit 200 in which similar components assume identical reference numbers. In this case, the input circuit 201, the H-bridge full-wave rectifier 203, the transformer T1, the capacitors C1, C2 and C3, the resistor R, the diodes D1 and D2 and the electronic switch Q1 are included and configured in substantially similar manner. The output current control loop 702 includes a sense resistor RSEN, a gain block 703, a comparator 705, an isolation module 707 and a PWM controller 709. The PWM controller 709 replaces the oscillator 217 and provides the SQW signal to the gate of Q1. RSEN is coupled between SGND and a node 701 representing the negative polarity of VOUT. Node 701 develops a current sense voltage VSEN, which is provided to the input of the gain block 703. The gain block 703 multiplies VSEN by a constant K1, and provides a voltage K1·VSEN to one input of the comparator 705. The other input of the comparator 705 receives a voltage $V_{IOUTMAX}$, and the output of the comparator 705 is provided to the input of an isolation circuit 707. The output of the isolation circuit 707 develops a current control voltage ICTL, which is provided to the input of the PWM controller 709. The PWM controller 709 has an output providing SQW, which has a frequency determined by a value FSET and a maximum duty cycle DMAX determined by a value DSET.

In operation, output current $I_{OUT}$ flows through the load, such as the LED circuit 111, and through the sense resistor RSEN developing the sense voltage VSEN. The gain block 703 multiplies VSEN by K1 and the comparator 705 compares K1·VSEN with $V_{IOUTMAX}$. The voltage $V_{IOUTMAX}$ represents a maximum level for $I_{OUT}$ during normal operation. The isolation circuit 707 isolates the input (primary) from the output (secondary) in a similar manner as described above for the optical coupler U2 of the driver circuit 600. In alternative non-isolation embodiments, the isolation circuit 707 may be omitted. In a similar manner as previously described for VERR used by the driver circuit 600, ICTL may be held to a maximum voltage so that the PWM controller 709 asserts SQW with a duty cycle of DMAX indicated by DSET. When the output current $I_{OUT}$ reaches or attempts to exceed a predetermined maximum level as indicated by $V_{IOUTMAX}$, the comparator 705 adjusts ICTL via the isolation circuit 707 to reduce the duty cycle of SQW. In response, the PWM controller 709 reduces the duty cycle of SQW to prevent $I_{OUT}$ from exceeding the predetermined maximum level. As further described below, the value of $V_{IOUTMAX}$, which dictates the maximum level of $I_{OUT}$, is set based on the level of VMIN, so that the LED circuit 111 attains maximum brightness when the AC line voltage is at or above VMIN while the dimmer circuit 103 is set at minimal or no dimming.

Figure 8:
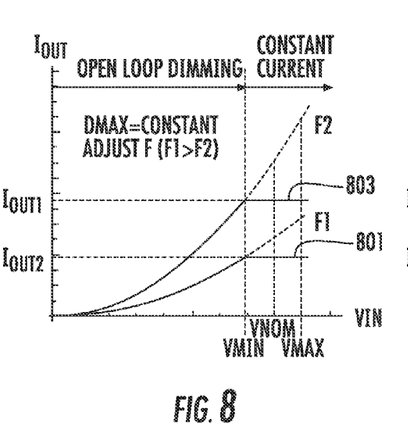
FIG. 8 is a graphic diagram plotting $I_{OUT}$ versus VIN for a constant maximum duty cycle DMAX with adjustment of frequency F for the driver circuit of FIG. 7.

FIG. 8 is a graphic diagram plotting $I_{OUT}$ versus VIN for a constant maximum duty cycle DMAX with adjustment of frequency F for the driver circuit 700. Further, in accordance with an embodiment, the frequency F is set for a desired maximum output current $I_{OUT}$ at the voltage level of VMIN for a fixed maximum duty cycle DMAX. As shown in FIG. 8, for a higher maximum output current, shown as $I_{OUT1}$, F is set at a lower frequency level F2, and for a lower maximum output current, shown as $I_{OUT2}$, F is set at a higher frequency level F1. The maximum level of $I_{OUT}$ is selected based on the type, number and coupling configuration of the LED circuit 111 being driven at the output. The reference value $V_{IOUTMAX}$ is set based on the desired maximum level of $I_{OUT}$. While the input voltage VIN is chopped for dimming operation such that VIN is below VMIN, open loop dimming operation dominates and $I_{OUT}$ varies with the square of VIN as previously described. When VIN reaches or exceeds VMIN, the output current remains constant at its predetermined maximum level according to closed loop current operation. If the maximum current is $I_{OUT2}$ for F1, then $I_{OUT}$ remains constant at $I_{OUT2}$ for VIN above VMIN as shown at 801. If the maximum current is $I_{OUT1}$ for F2, then $I_{OUT}$ remains constant at $I_{OUT1}$ for VIN above VMIN as shown at 803.

Figure 9:
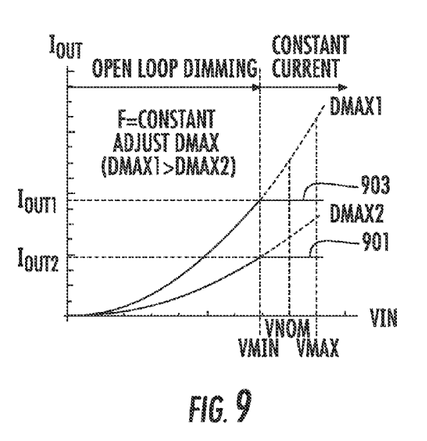
FIG. 9 is a graphic diagram plotting $I_{OUT}$ versus VIN for a constant frequency F with adjustment of DMAX for the driver circuit of FIG. 7.

FIG. 9 is a graphic diagram plotting $I_{OUT}$ versus VIN for a constant frequency F with adjustment of DMAX for the driver circuit 700. In this case, the DMAX is set for a desired maximum output current $I_{OUT}$ for the minimum input voltage VMIN for a fixed frequency F. As shown in FIG. 9, for a higher output current, shown as $I_{OUT1}$, DMAX is set at a higher level DMAX1, and for a lower output current, shown as $I_{OUT2}$, DMAX is set at a lower level DMAX2. Again, the maximum level of $I_{OUT}$ is selected based on the type, number and coupling configuration of the LED circuit 111 being driven at the output. The reference value $V_{IOUTMAX}$ is set based on the desired maximum level of $I_{OUT}$. While the input voltage VIN is chopped for dimming operation such that VIN is below VMIN, open loop dimming operation dominates and $I_{OUT}$ varies with the square of VIN as previously described. When VIN reaches or exceeds VMIN, the output current $I_{OUT}$ remains constant at its predetermined maximum level according to closed loop current operation. If the maximum current is $I_{OUT2}$ for DMAX2, then $I_{OUT}$ remains constant at $I_{OUT2}$ for VIN above VMIN as shown at 901. If the maximum current is $I_{OUT1}$ for DMAX1, then $I_{OUT}$ remains constant at $I_{OUT1}$ for VIN above VMIN as shown at 903.

Figure 10:
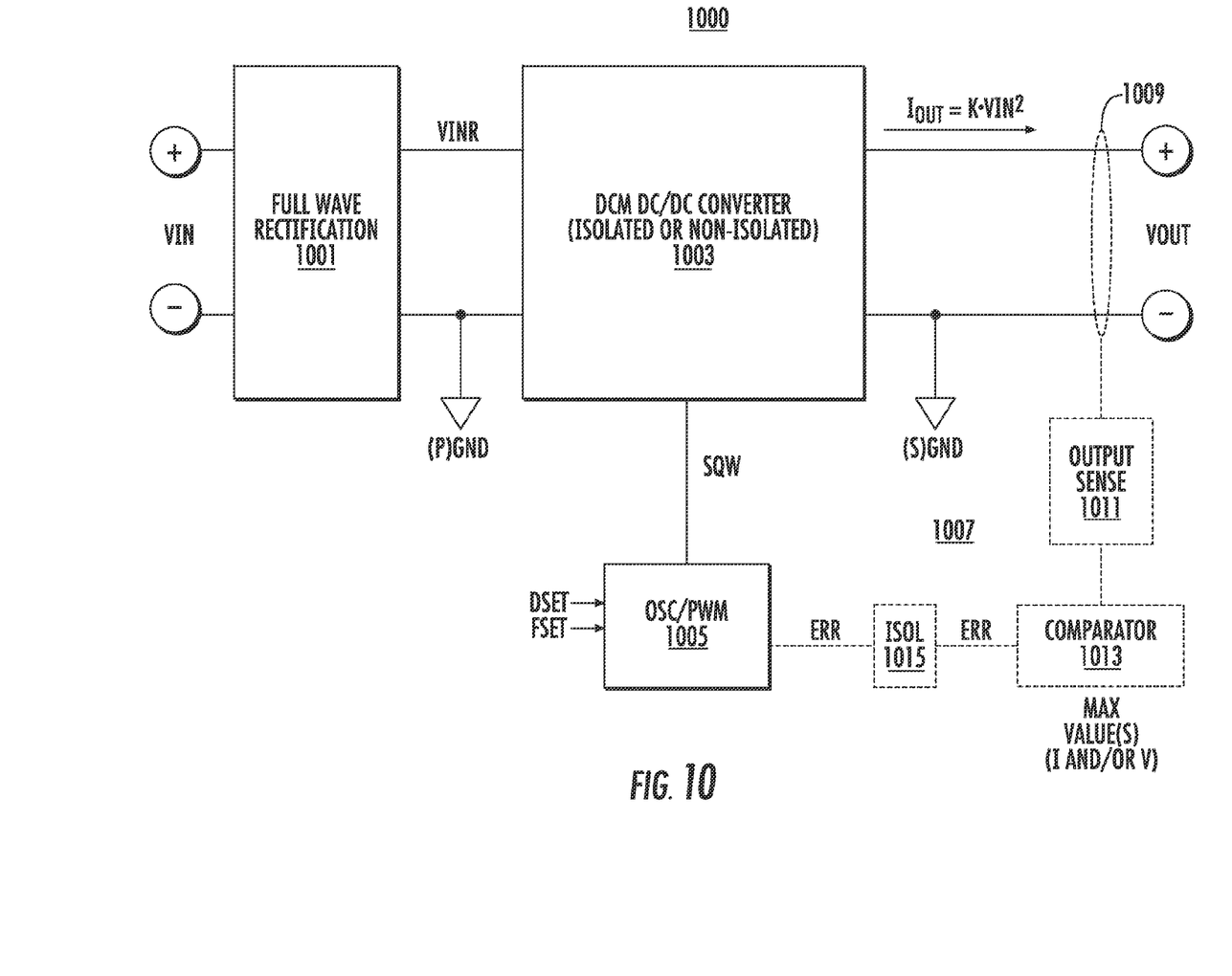
FIG. 10 is a simplified block diagram of an open loop driver circuit according to a more generalized embodiment which may be used as the driver circuit of FIG. 1.

FIG. 10 is a simplified block diagram of an open loop driver circuit 1000 according to a more generalized embodiment which may be used as the driver circuit 105. Operation of the driver circuit 1000 is similar to the driver circuits previously described but is shown in more generalized format. VIN (AC conductive angle modulated voltage) from the circuit 103 is provided to the input of a full wave rectification circuit 1001, which provides rectified input voltage VINR relative to ground GND. The driver circuit 1000 is shown for both isolated and non-isolated formats, in which GND is common for both input and output for the non-isolated case, and is separated as primary ground PGND and secondary ground SGND for the isolated case. VINR is provided to an input of a DCM DC/DC converter 1003, which is implemented for isolated or non-isolated formats. In one embodiment, the DCM DC/DC converter 1003 is configured as a single stage active power factor correction (PFC) converter. The DCM DC/DC converter 1003 provides VOUT at its output relative to GND, in which VOUT is generally constant. The output is shown providing an output current $I_{OUT} = K \cdot VIN^2$ in a similar manner as previously described. An oscillator/PWM (OSC/PWM) circuit 1005 is shown providing the control signal SQW to another input of the DCM DC/DC converter 1003 for controlling DC/DC conversion. The OSC/PWM circuit 1005 may be implemented as a relatively simple oscillator circuit providing SQW with a duty cycle and frequency to set the output current (or power) at a desired level for a nominal voltage level VNOM as previously described. The duty cycle and frequency may be fixed by the oscillator. In another embodiment, one or both of these parameters may be adjusted using a duty cycle set input DSET and/or a frequency set input FSET as previously described. Also, one of these parameters may be set and the other adjusted to achieve the desired output current at VNOM.

The driver circuit 1000 operates in an open loop manner in which the output current is determined by the level of the input voltage. As previously described, it may be desired to limit the output current and/or output voltage to maximum levels. The driver circuit 1000 may further include a control circuit 1007 including an output sensor 1009, an output sense circuit 1011, a comparator circuit 1013, and an isolation circuit 1015, each shown using dashed lines. The output sensor 1009 senses one or both of output voltage and output current and provides at least one sense signal to the output sense circuit 1011. The output sense circuit 1011 amplifies or scales the sense signals to provide at least one sense signal to the comparator circuit 1013. The comparator circuit 1013 compares each sense signal with a corresponding reference value for determining one or more error signals ERR. For example, a current or voltage sense signal indicating output current or voltage may be compared with a maximum current or voltage reference value, respectively. The comparator circuit 1013 asserts the ERR signal indicative of the difference between the output parameter and the reference value. The ERR signal is provided directly to the OSC/PWM circuit 1005 (for non-isolated configurations) or through the isolation circuit 1015 (for isolated configurations) for controlling at least one of the duty cycle or frequency of SQW to control the maximum level of the output parameter. As previously described, for example, in one embodiment the output current $I_{OUT}$ is limited to a maximum level once the input voltage reaches VMIN so that the brightness level of the output LED's 111 remains constant when VIN varies between VIN and VMAX.

A light emitting diode driver with open loop dimming control according to one embodiment includes a full wave rectifier circuit, a DC/DC converter, and an oscillator circuit. The full wave rectifier circuit is configured to receive an input voltage in the form of an AC conductive angle modulated voltage and to provide a corresponding rectified voltage. The DC/DC converter converts the rectified voltage to an output voltage and an output current, in which the output current has a magnitude which varies proportionately with a square of a quadratic mean (or RMS) of the input voltage. The oscillator circuit controls switching of the DC/DC converter with constant frequency and with constant duty cycle.

In one embodiment the input voltage is based on modulating an AC line voltage which has a nominal voltage level. Either one of the frequency and duty cycle is determined so that the output current has a predetermined magnitude when the input voltage is at the nominal voltage level. For example, the predetermined magnitude of the output current may be based on the particular number and coupling configuration of the LEDs being driven by the LED driver. The driver may be equipped with an overvoltage protection circuit to limit the output voltage to a maximum level. Thus, when the output voltage reaches the maximum level, either one of the frequency and duty cycle is controlled to limit the output voltage.

In addition or in the alternative, the driver circuit may be equipped with a maximum current control circuit to limit the output current to a maximum level. The maximum output current level may be determined based on the particular number and coupling configuration of the LEDs being driven by the LED driver. When the maximum current level is reached, one of the frequency or duty cycle is controlled to maintain current at the maximum level. The maximum output current level may be based on the minimum normal operating voltage of the AC line voltage. Thus, when the AC conductive angle modulated input voltage reaches the minimum voltage level of the normal operating range of the AC line voltage, the current remains constant when the input voltage rises above this minimum level. The DC/DC converter may be operated in DCM. The DC/DC converter may be a flyback converter implemented using a transformer and switch circuit configured for flyback operation. The oscillator controls the switch circuit with a constant frequency and a constant duty cycle to operate the transformer in discontinuous current mode.

A light emitting diode control circuit according to one embodiment includes a dimmer circuit and an open loop driver circuit. The dimmer circuit has an input receiving an AC line voltage and an output providing an AC conductive angle modulated voltage. The open loop driver circuit has an input receiving the AC conductive angle modulated voltage and has an output providing a relatively constant output voltage and providing an output current which varies proportionately with a square of a quadratic mean of the AC conductive angle modulated voltage. The dimmer circuit may be implemented as a triac dimmer or the like.

In one embodiment, the open loop driver circuit includes a full wave rectifier circuit, a transformer, a switch circuit, and output circuit, and an oscillator circuit. The full wave rectifier circuit has an input receiving the AC conductive angle modulated voltage and an output providing a rectified voltage. The transformer has a primary winding and a secondary winding. The switch circuit has a current path and a control terminal, where the current path is coupled in series with the primary winding of the transformer between the rectified voltage and a reference voltage. The output circuit includes an output rectifier and filter circuit coupled to the secondary winding of the transformer, and forms the output of the open loop driver circuit. The transformer, switch circuit, and output circuit may be configured for flyback converter operation. The oscillator circuit provides a control signal to the control terminal of the switch circuit, in which the control signal has a constant frequency and a constant duty cycle to operate the transformer in discontinuous current mode during flyback converter operation.

A method of driving a light emitting diode circuit with open loop dimming control according to one embodiment includes rectifying an AC conductive angle modulated voltage and providing a rectified voltage, and converting the rectified voltage to an output voltage and an output current using a control signal having a constant frequency and a constant duty cycle. The output voltage is substantially constant and the output current has a magnitude which varies proportionately with a square of a quadratic mean of the AC conductive angle modulated voltage.

The method may include modulating an AC line voltage to provide the AC conductive angle modulated voltage, in which the AC line voltage has a nominal voltage level, and fixing one and determining the other of the frequency and duty cycle of the control signal so that the output current has a predetermined magnitude when the AC conductive angle modulated voltage is at a voltage level equal to the nominal voltage level of the AC line voltage. The method may include limiting the output current to a predetermined maximum current level. The method may include modulating an AC line voltage to provide the AC conductive angle modulated voltage, in which the AC line voltage has a normal operating range between a minimum voltage level and a maximum voltage level, fixing one and determining the other of the frequency and duty cycle of the control signal so that the output current has the predetermined maximum current level when the AC conductive angle modulated voltage is at the minimum voltage level, and during operation, adjusting one of the frequency and the duty cycle of the control signal to limit the output current to the predetermined maximum current level when the AC conductive angle modulated voltage is above the minimum voltage level. The method may include providing the control signal to a switch which switches primary current of a transformer of a flyback converter and operating the transformer in discontinuous current mode.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A light emitting diode driver with open loop dimming control, comprising:
    a full wave rectifier circuit configured to receive an input voltage and to provide a rectified voltage, wherein said input voltage comprises an AC conductive angle modulated voltage;
    a DC/DC converter which converts said rectified voltage to an output voltage and an output current, wherein said output current has a magnitude which varies proportionately with a square of a quadratic mean of said input voltage; and
    an oscillator circuit which controls switching of said DC/DC converter with constant frequency and with constant duty cycle.

2. The light emitting diode driver of claim 1, wherein said rectified voltage has approximately the same quadratic mean voltage level of said input voltage.

3. The light emitting diode driver of claim 1, wherein said output voltage remains relatively constant.

4. The light emitting diode driver of claim 1, wherein said input voltage is based on modulating an AC line voltage having a nominal voltage level, and wherein one of said frequency and said duty cycle is fixed and the other is determined so that said output current has a predetermined magnitude when said input voltage is at said nominal voltage level.

5. The light emitting diode driver of claim 1, further comprising:
    an overvoltage protection circuit which senses said output voltage and which provides an output voltage indication; and
    wherein said oscillator circuit comprises a pulse width modulation control circuit which receives said overvoltage indication and which controls one of said frequency and said duty cycle to prevent said output voltage from rising above a predetermined maximum level.

6. The light emitting diode driver of claim 1, further comprising:
    a maximum current control circuit which senses said output current and which provides a current control signal indicative of said output current; and
    wherein said oscillator circuit comprises a pulse width modulation control circuit which receives said current control signal and which controls one of said frequency and said duty cycle to prevent said output current from rising above said predetermined maximum current level.

7. The light emitting diode driver of claim 6, wherein:
    said input voltage is based on modulating an AC line voltage having normal operating range between a minimum voltage level and a maximum voltage level; and
    wherein said pulse width modulation control circuit controls one of said frequency and said duty cycle so that said predetermined maximum current level of said output current is maintained while said input voltage has a level that is within said normal operating range of said AC line voltage.

8. The light emitting diode driver of claim 1, wherein said DC/DC converter comprises a flyback converter, which comprises:
    a transformer having a primary winding and a secondary winding;

a switch circuit having a current path and a control terminal, wherein said current path is coupled in series with said primary winding of said transformer between said rectified voltage and a reference voltage;

an output circuit having an input coupled to said secondary winding of said transformer and having an output, wherein said output circuit comprises an output rectifier and filter circuit; and wherein said oscillator circuit provides a control signal to said control terminal of said switch circuit, wherein said control signal has a constant frequency and a constant duty cycle to operate said transformer in discontinuous current mode.

9. A light emitting diode control circuit, comprising:

a dimmer circuit having an input receiving an AC line voltage and an output providing an AC conductive angle modulated voltage; and an open loop driver circuit having an input receiving said AC conductive angle modulated voltage and having an output providing a relatively constant output voltage and providing an output current which varies proportionately with a square of a quadratic mean of said AC conductive angle modulated voltage.

10. The light emitting diode control circuit of claim 9, wherein said dimmer circuit comprises a triac dimmer.

11. The light emitting diode control circuit of claim 9, wherein said AC line voltage has a nominal voltage level, and wherein one of said frequency and said duty cycle is fixed and the other determined so that said output current is at a predetermined level when said AC conductive angle modulated voltage is at said nominal voltage level.

12. The light emitting diode control circuit of claim 9, wherein said open loop driver circuit further comprises:

a maximum current control circuit which senses said output current of said open loop driver circuit and which provides a current control signal indicative thereof; and wherein said open loop driver circuit receives said current control signal and adjusts one of said frequency and said duty cycle during operation to prevent said output current from rising above said predetermined maximum current level.

13. The light emitting diode control circuit of claim 12, wherein said maximum current control circuit comprises a comparator which compares a sensed output current level with a predetermined maximum current value.

14. The light emitting diode control circuit of claim 12, wherein:

said AC line voltage has a normal operating voltage range between a minimum operating voltage level and a maximum operating voltage level; and wherein one of said frequency and said duty cycle is fixed and the other controlled by said open loop driver circuit during operation so that said predetermined maximum current level of said output current is maintained while said AC conductive angle modulated voltage is within said normal operating voltage range.

15. The light emitting diode control circuit of claim 9, wherein said open loop driver circuit comprises:

a full wave rectifier circuit having an input receiving said AC conductive angle modulated voltage and an output providing a rectified voltage;

a transformer having a primary winding and a secondary winding;

a switch circuit having a current path and a control terminal, wherein said current path is coupled in series with said primary winding of said transformer between said rectified voltage and a reference voltage;

an output circuit comprising an output rectifier and filter circuit coupled to said secondary winding of said transformer and forming said output of said open loop driver circuit;

wherein said transformer, said switch circuit, and said output circuit are configured for flyback converter operation; and an oscillator circuit providing a control signal to said control terminal of said switch circuit, wherein said control signal has a constant frequency and a constant duty cycle to operate said transformer in discontinuous current mode during flyback converter operation.

16. A method of driving a light emitting diode circuit with open loop dimming control, comprising:

rectifying an AC conductive angle modulated voltage and providing a rectified voltage; and converting the rectified voltage to an output voltage and an output current using a control signal having a constant frequency and a constant duty cycle, wherein the output voltage is substantially constant and wherein the output current has a magnitude which varies proportionately with a square of a quadratic mean of the AC conductive angle modulated voltage.

17. The method of claim 16, further comprising:

modulating an AC line voltage to provide the AC conductive angle modulated voltage, wherein the AC line voltage has a nominal voltage level; and fixing one and determining the other of the frequency and duty cycle of the control signal so that the output current has a predetermined magnitude when the AC conductive angle modulated voltage is at a voltage level equal to the nominal voltage level of the AC line voltage.

18. The method of claim 16, further comprising limiting the output current to a predetermined maximum current level.

19. The method of claim 18, further comprising:

modulating an AC line voltage to provide the AC conductive angle modulated voltage, wherein the AC line voltage has a normal operating range between a minimum voltage level and a maximum voltage level;

fixing one and determining the other of the frequency and duty cycle of the control signal so that the output current has the predetermined maximum current level when the AC conductive angle modulated voltage is at the minimum voltage level; and during operation, adjusting one of the frequency and the duty cycle of the control signal to limit the output current to the predetermined maximum current level when the AC conductive angle modulated voltage is above the minimum voltage level.

20. The method of claim 16, wherein said converting the rectified voltage comprises providing the control signal to a switch which switches primary current of a transformer of a flyback converter and operating the transformer in discontinuous current mode.

* * * * *